(12) United States Patent
West

(10) Patent No.: US 9,429,198 B2
(45) Date of Patent: Aug. 30, 2016

(54) COUPLING DEVICE FOR A RIDE LAWNMOWER ENGINE AND A ROTARY PUMP

(71) Applicant: Alfonzo West, Wichita, KS (US)

(72) Inventor: Alfonzo West, Wichita, KS (US)

( * ) Notice: Subject to any disclaimer, the term of this patent is extended or adjusted under 35 U.S.C. 154(b) by 71 days.

(21) Appl. No.: 14/551,469

(22) Filed: Nov. 24, 2014

(65) Prior Publication Data

US 2015/0159703 A1 Jun. 11, 2015

Related U.S. Application Data

(60) Provisional application No. 61/914,211, filed on Dec. 10, 2013.

(51) Int. Cl.
 *A01D 69/08* (2006.01)
 *F16D 11/10* (2006.01)
 *F16D 3/10* (2006.01)
 *F16D 3/12* (2006.01)

(52) U.S. Cl.
 CPC ............... *F16D 11/10* (2013.01); *A01D 69/08* (2013.01); *Y10T 29/49826* (2015.01)

(58) Field of Classification Search
 CPC ............. F16D 11/10; F16D 3/10; F16D 3/12
 See application file for complete search history.

(56) References Cited

U.S. PATENT DOCUMENTS

| | | | | | |
|---|---|---|---|---|---|
| 1,825,574 | A | * | 9/1931 | Brown | A01D 69/08 180/54.1 |
| 3,080,031 | A | * | 3/1963 | Young | F16D 11/10 192/101 |
| 3,128,677 | A | * | 4/1964 | Tennis | E02F 3/432 137/624.27 |
| 5,360,376 | A | * | 11/1994 | Baldino | F16D 11/10 464/154 |

* cited by examiner

*Primary Examiner* — Jacob S Scott
*Assistant Examiner* — Tinh Dang

(57) ABSTRACT

A coupling device for a ride lawnmower engine and a rotary pump is a device that is utilized to connect and transmit power between two shafts such as the driveshaft of a ride lawnmower engine and the input sleeve of a rotary pump. The device features a tubular coupling shaft with an axial motor adapter used to connect the driveshaft and the input sleeve. A compression spring is mounted within an open end of the tubular coupling shaft and is able to vertically lower the tubular coupling shaft towards the driveshaft in order to allow the axial motor adapter to engage the driveshaft. Conversely, the compression spring is compressed when the tubular coupling shaft is vertically raised. A height adjusting clamp is utilized to regulate the vertical positioning of the driveshaft coupling device in order to allow manual engagement and disengagement of the ride lawnmower engine and the rotary pump.

17 Claims, 15 Drawing Sheets

SECTION A-A

SECTION C-C

US 9,429,198 B2

COUPLING DEVICE FOR A RIDE LAWNMOWER ENGINE AND A ROTARY PUMP

The current application claims a priority to the U.S. Provisional Patent application Ser. No. 61/914,211 filed on Dec. 10, 2013.

FIELD OF THE INVENTION

The present invention relates generally to a driveshaft coupling device. More specifically, the present invention is a manually engaging and disengaging coupling device for connecting and transmitting power between two driveshafts.

BACKGROUND OF THE INVENTION

Transmission of power in mechanically-powered rotary machinery is most often accomplished through a device known as a clutch. A clutch allows for the transmittance of power between two devices and may often be engaged and disengaged as needed. Perhaps the simplest form of clutch is a driveshaft coupling. A driveshaft coupling is able to couple two coaxial shafts to each other in order to allow for the transmittance of power between the two rotating shafts. A typical driveshaft coupling generally features two input sockets that may be attached to the two corresponding coaxial shafts. One disadvantage presented by these types of driveshaft couplings is the fact that the couplings are often permanently installed or difficult to remove through a labor heavy procedure. A permanently installed or difficult to remove driveshaft coupling is problematic due to the fact that both devices that are attached to the driveshaft coupling are continuously running. As such, a convenient means of uncoupling the two devices from each other as needed is often desirable.

The present invention is a driveshaft coupling device for connecting and transmitting power between two driveshafts that may be manually engaged and disengaged by the user as needed. The present invention is primarily intended for use in coupling the driveshaft of a ride lawnmower to a rotary pump in order to allow the ride lawnmower to be utilized as a power source for the rotary pump. A ride lawnmower's driveshaft is vertically oriented in order to provide rotary motion to the ride lawnmower blades. Rotary pumps often function through vertically oriented rotary motion as well, allowing the ride lawnmower to be utilized as a power source for the rotary pump through a coupling device. The present invention allows a rotary pump to be mounted to the top flywheel cover of a ride lawnmower during use. In order to ensure that the rotary pump is not continuously running, the present invention features a means of conveniently disengaging the rotary pump from the ride lawnmower.

DETAIL DESCRIPTIONS OF THE INVENTION

Figure 1:
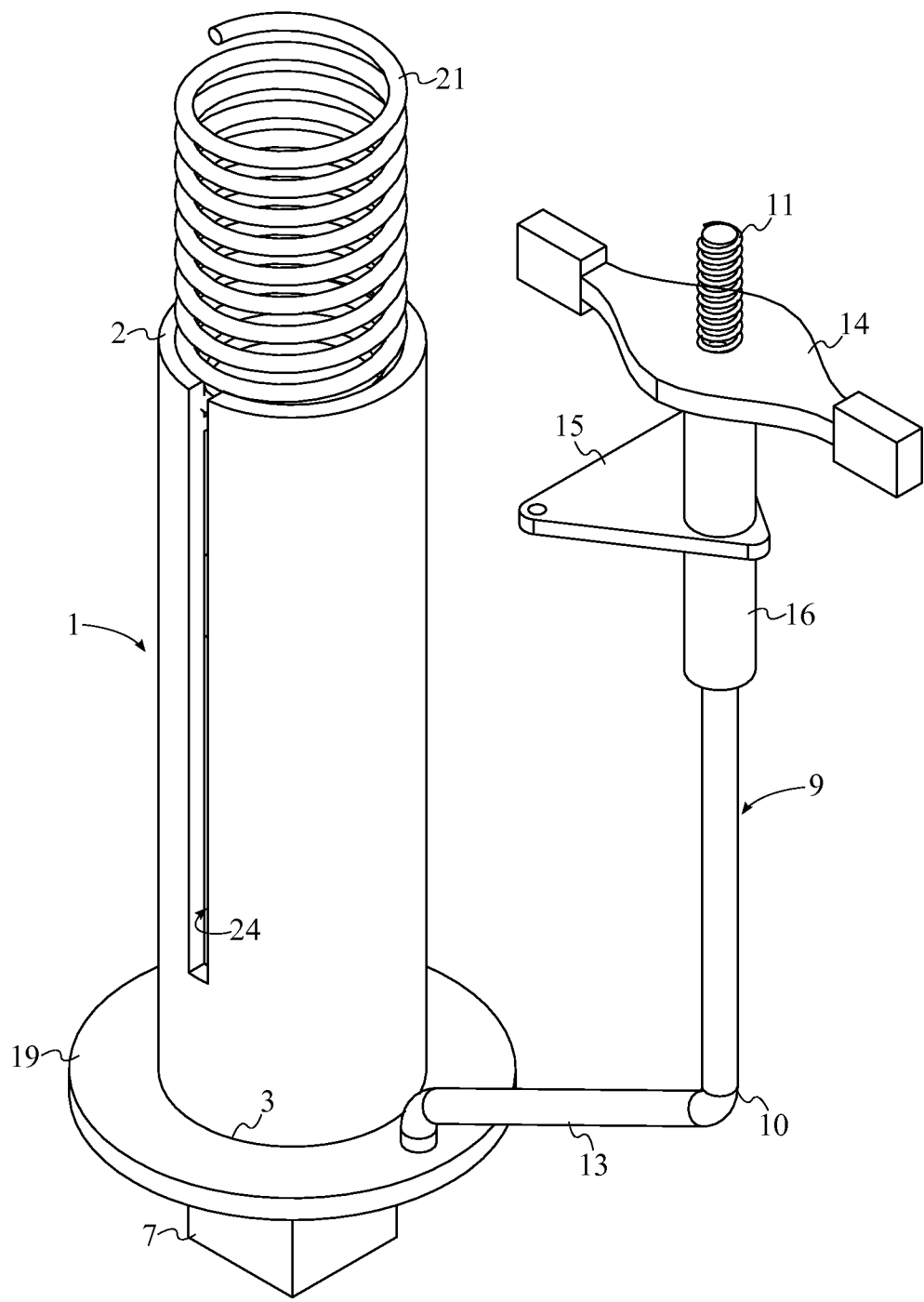
FIG. 1 is a perspective view of the present invention.
Figure 2:
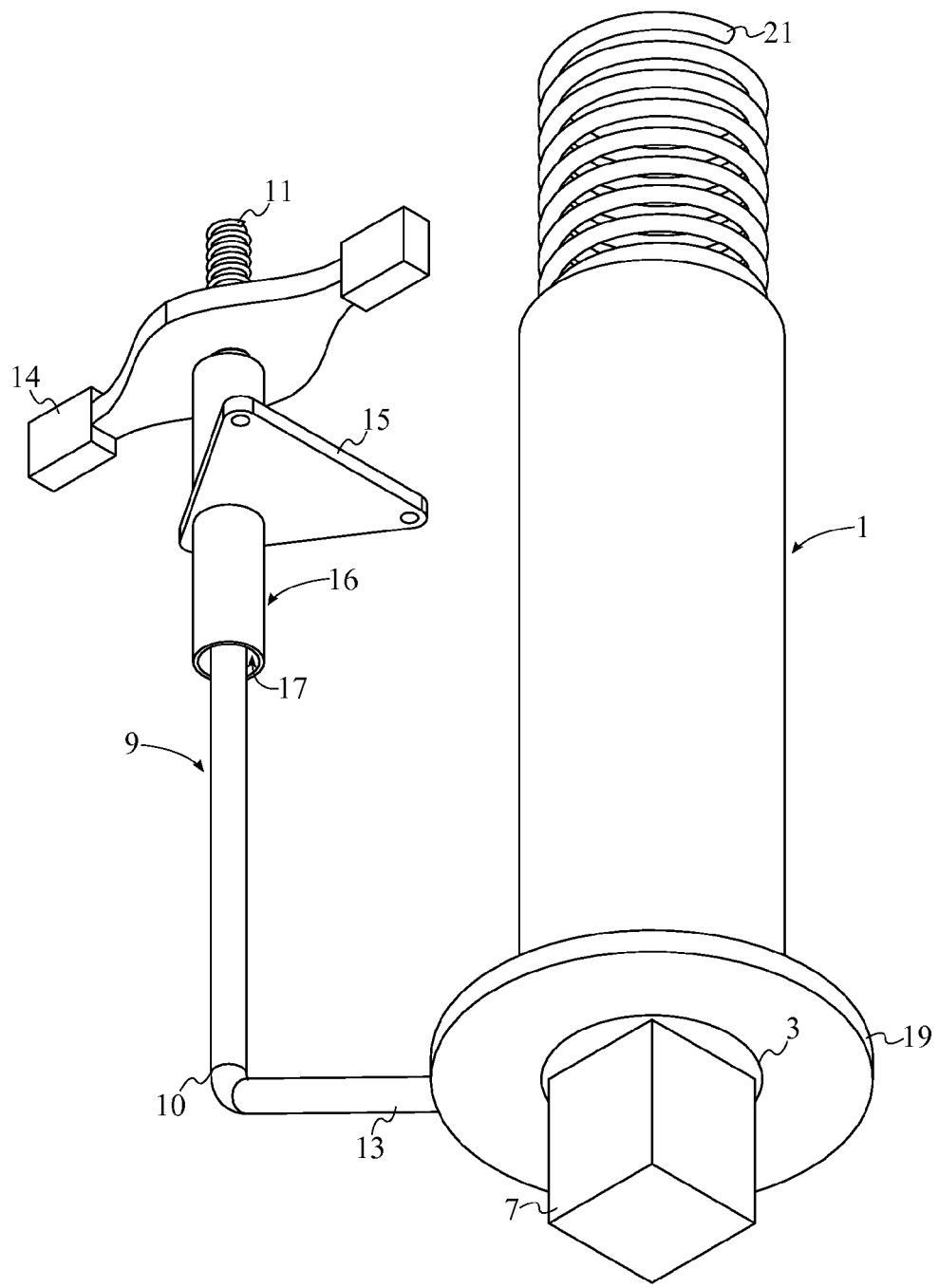
FIG. 2 is an alternate perspective view of the present invention.

All illustrations of the drawings are for the purpose of describing selected versions of the present invention and are not intended to limit the scope of the present invention.

With reference to FIGS. 1-4, FIG. 9, and FIG. 10, the present invention is a driveshaft coupling device for connecting and transmitting power between two driveshafts while allowing the user to manually engage and disengage the coupling device. The present invention is primarily intended for use in connecting a ride lawnmower engine 26 to a rotary pump 30 as shown in FIGS. 11-15. The components of the ride lawnmower engine 26 and the rotary pump 30 are described hereinafter in order to explain the components of the present invention in relation to the components of the ride lawnmower engine 26 and the rotary pump 30. The ride lawnmower engine 26 comprises a driveshaft 27 that rotates about a vertical axis 29 and is attachable to the present invention. Rotating elements of the ride lawnmower engine 26 are covered by an external covering 28 that is a mesh screen. The rotary pump 30 comprises an input sleeve 31 with a sleeve keyway slot 33 for the input sleeve for attachment to the present invention. This allows power to be transmitted from the ride lawnmower engine 26 to the rotary pump 30. Additionally, a plurality of offset legs 36 is radially connected about the rotary pump 30 and provides a stable means of mounting the rotary pump 30 to a surface.

Again referring to FIGS. 1-4, FIG. 9, and FIG. 10, the present invention comprises a tubular coupling shaft 1, an axial motor adapter 7, a height adjusting clamp 8, a washer 19, and a compression spring 21. The tubular coupling shaft 1 joins the driveshaft 27 to the rotary pump 30 as shown in FIGS. 11-15. The axial motor adapter 7 is attachable to the driveshaft 27 in order to allow rotational motion from the driveshaft 27 to be transferred to the tubular coupling shaft 1 and to the rotary pump 30. The height adjusting clamp 8 allows the user to engage and disengage the present invention in order to couple the ride lawnmower engine 26 and the rotary pump 30 together as well as to separate the ride lawnmower engine 26 and the rotary pump 30. The washer 19 secures the height adjusting clamp 8 to the tubular coupling shaft 1, allowing the user to regulate the pressure exerted on the tubular coupling shaft 1 by the height adjusting clamp 8. The compression spring 21 separates the ride lawnmower engine 26 and the rotary pump 30 when in a compressed state and may be relaxed via the height adjusting clamp 8 in order to couple the ride lawnmower engine 26 and the rotary pump 30.

Figure 12:
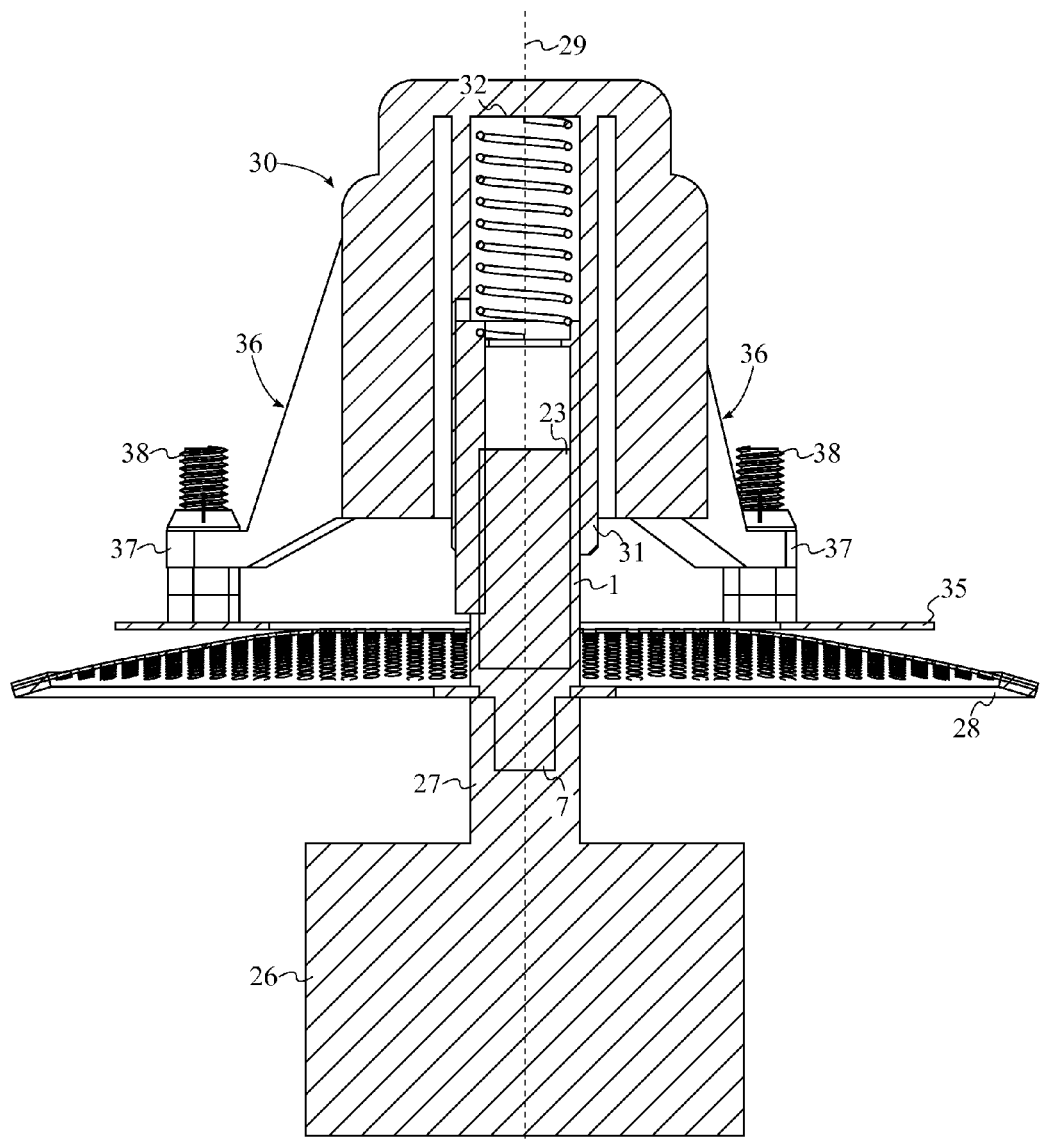
FIG. 12 is a cross-sectional view of the present invention coupled to the ride lawnmower engine and the rotary pump taken along line B-B of FIG. 11.

The tubular coupling shaft 1 comprises an open end 2 and a closed end 3. The open end 2 may be inserted into the input sleeve 31 while the closed end 3 is secured to the driveshaft 27. The axial motor adapter 7 is adjacently connected to the closed end 3 in order to allow the closed end 3 to be secured to the driveshaft 27. In the preferred embodiment of the present invention, the axial motor adapter 7 is a male shaft that may be attached to the driveshaft 27 as shown in FIG. 12. The tubular coupling shaft 1 is encircled by the washer 19. The washer 19 is able to exert pressure on the tubular coupling shaft 1 when the user wishes to engage or disengage the ride lawnmower engine 26 and the rotary pump 30. The height adjusting clamp 8 is laterally connected to the washer 19, allowing the washer 19 to exert pressure on the tubular coupling shaft 1 based on user input through the height adjusting clamp 8. The tubular coupling shaft 1 is rotatably connected to the washer 19, adjacent to the axial motor adapter 7. As such, the tubular coupling shaft 1 is able to rotate within the washer 19 as the tubular coupling shaft 1 is driven by the ride lawnmower engine 26, which allows the height adjusting clamp 8 to remain in a fixed position. The compression spring 21 is adjacently mounted into the open end 2. As such, the compression spring 21 may be compressed into the open end 2 when the ride lawnmower engine 26 and the rotary pump 30 are uncoupled from each other via the height adjusting clamp 8.

Figure 4:
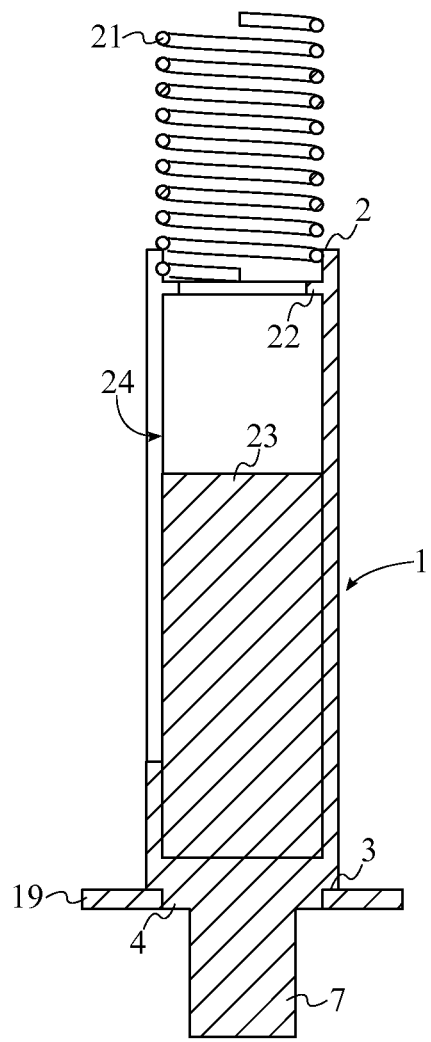
FIG. 4 is a cross-sectional view of the present invention taken along line A-A of FIG. 3.

The present invention further comprises a lip 22. The lip 22 holds the compression spring 21 in place within the open end 2 as shown in FIG. 4. The lip 22 is circumferentially integrated into the open end 2, preventing the compression spring 21 from falling into the tubular coupling shaft 1. The compression spring 21 is positioned against the lip 22, allowing the compression spring 21 to be compressed against the lip 22 when the ride lawnmower engine 26 is uncoupled from the rotary pump 30.

Figure 3:
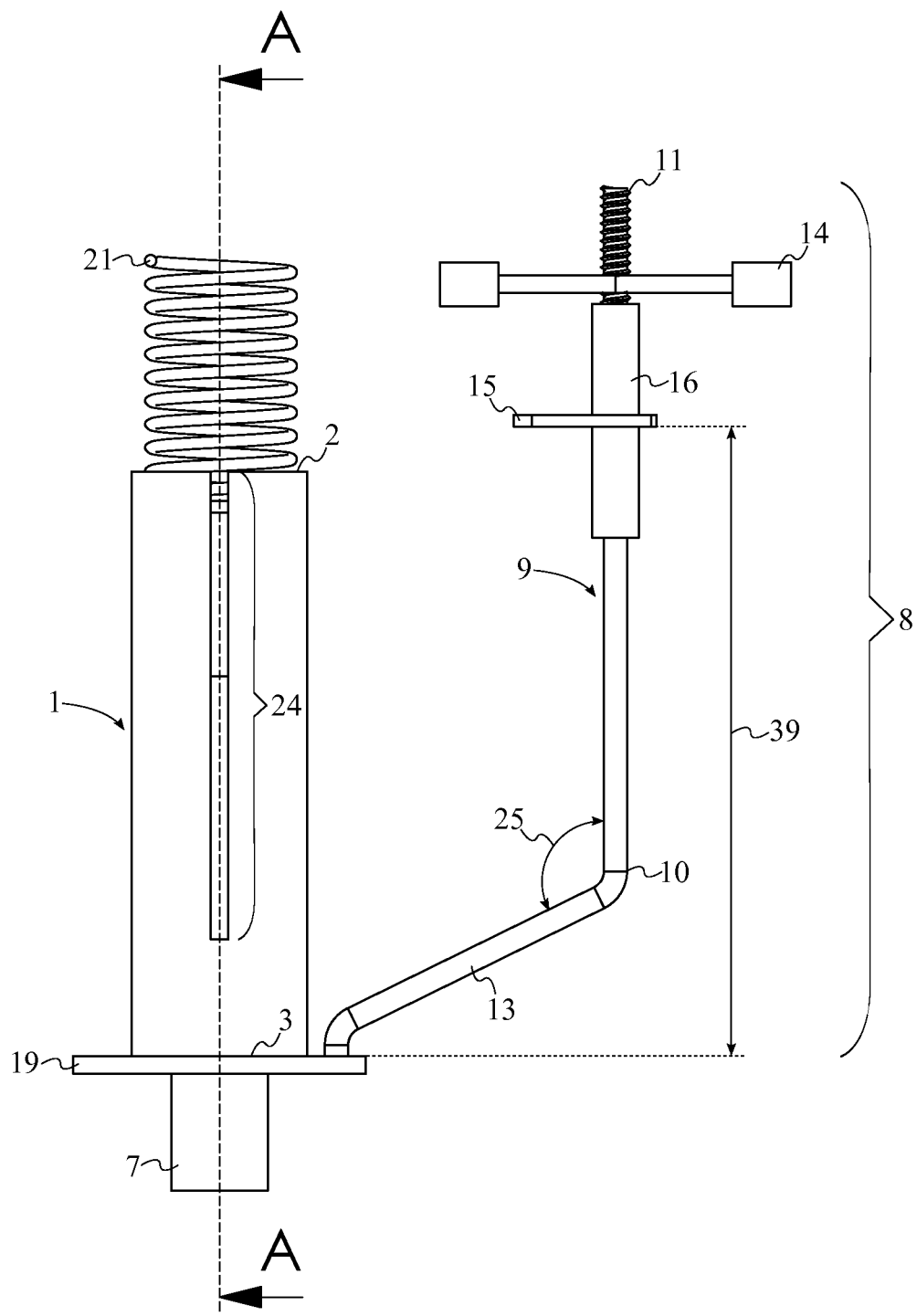
FIG. 3 is a front view of the present invention.
Figure 13:
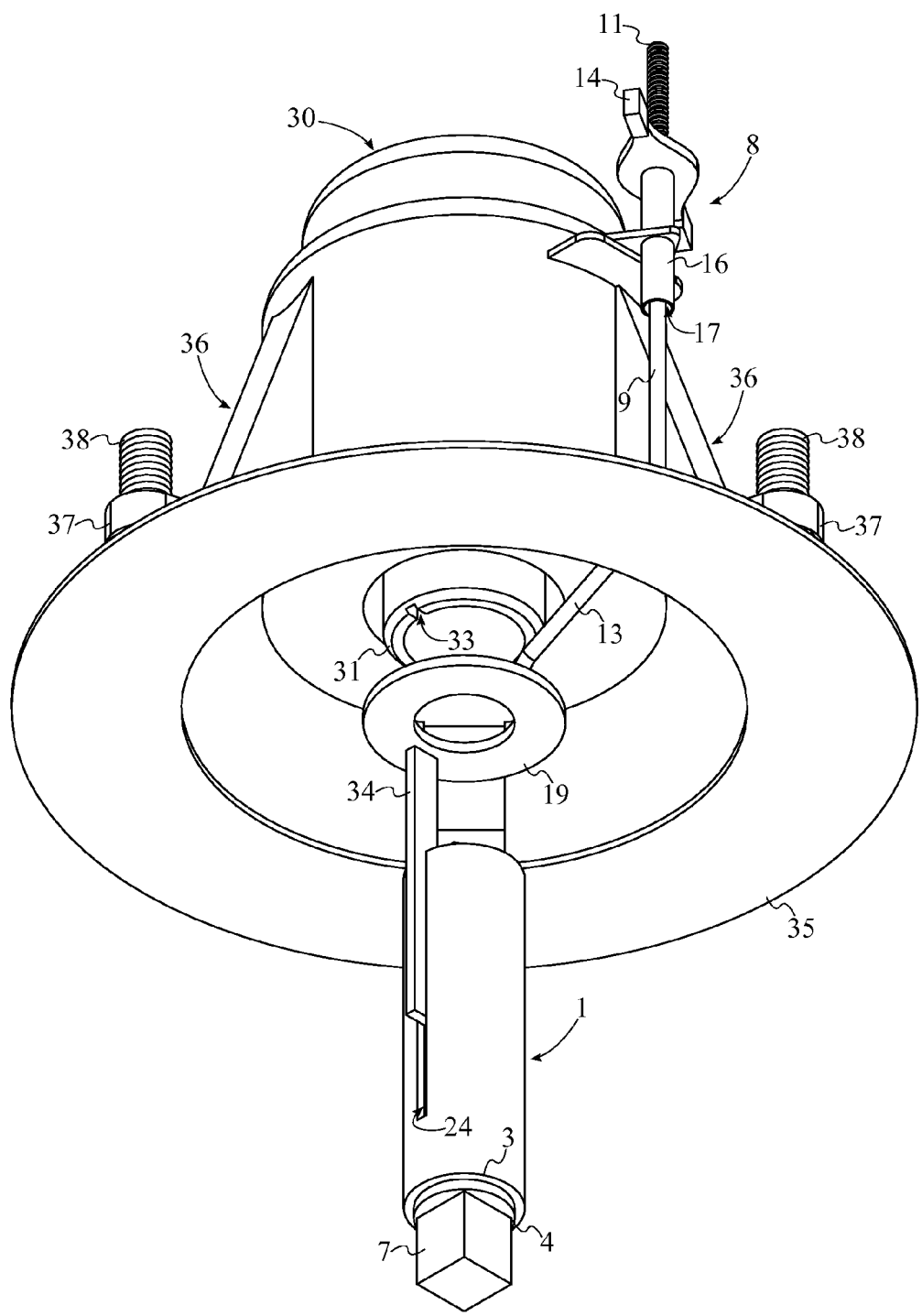
FIG. 13 is a partial exploded perspective view of the present invention, the pump, and the annular stabilizing plate.
Figure 14:
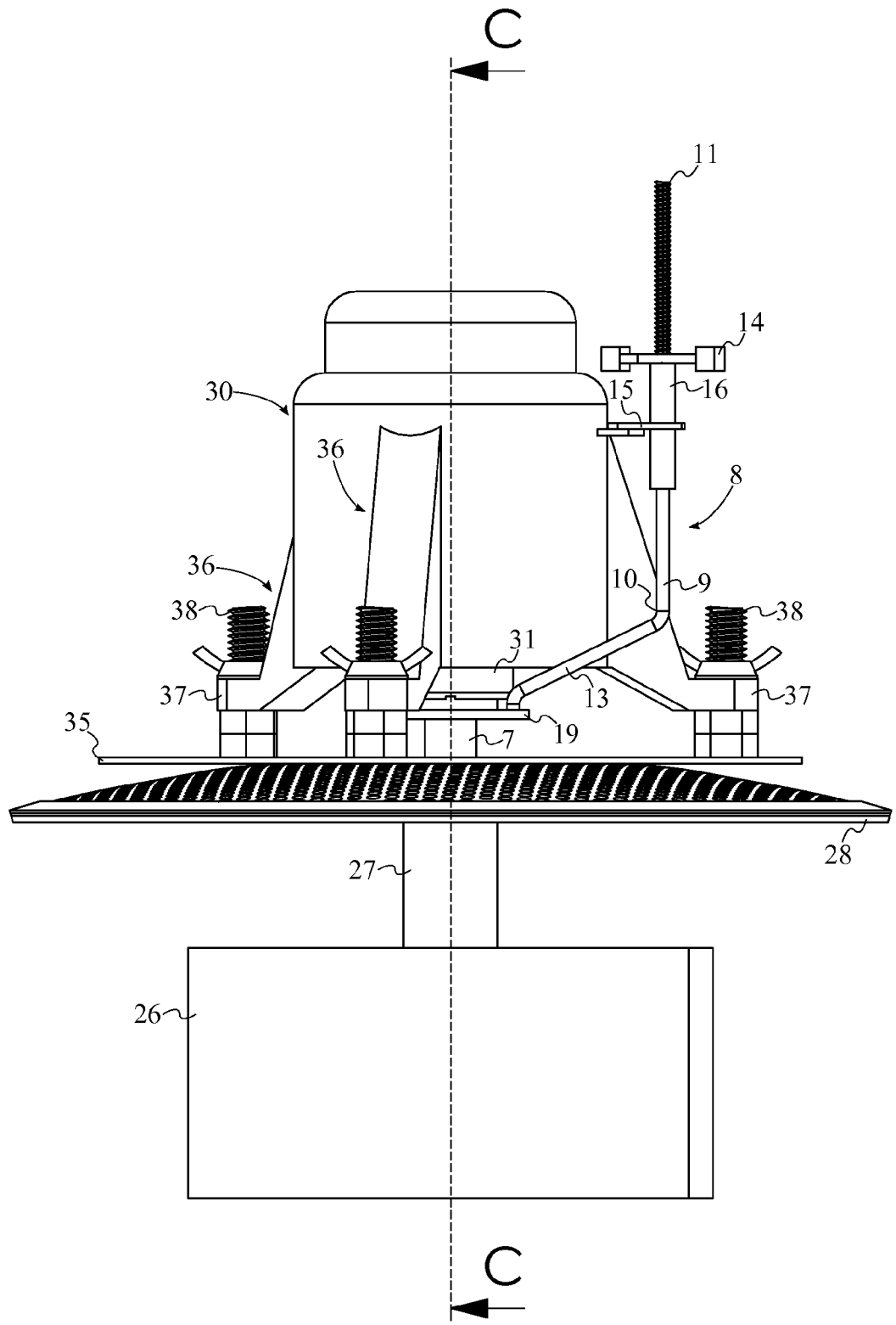
FIG. 14 is a front view of the present invention and the rotary pump uncoupled from the ride lawnmower engine.
Figure 15:
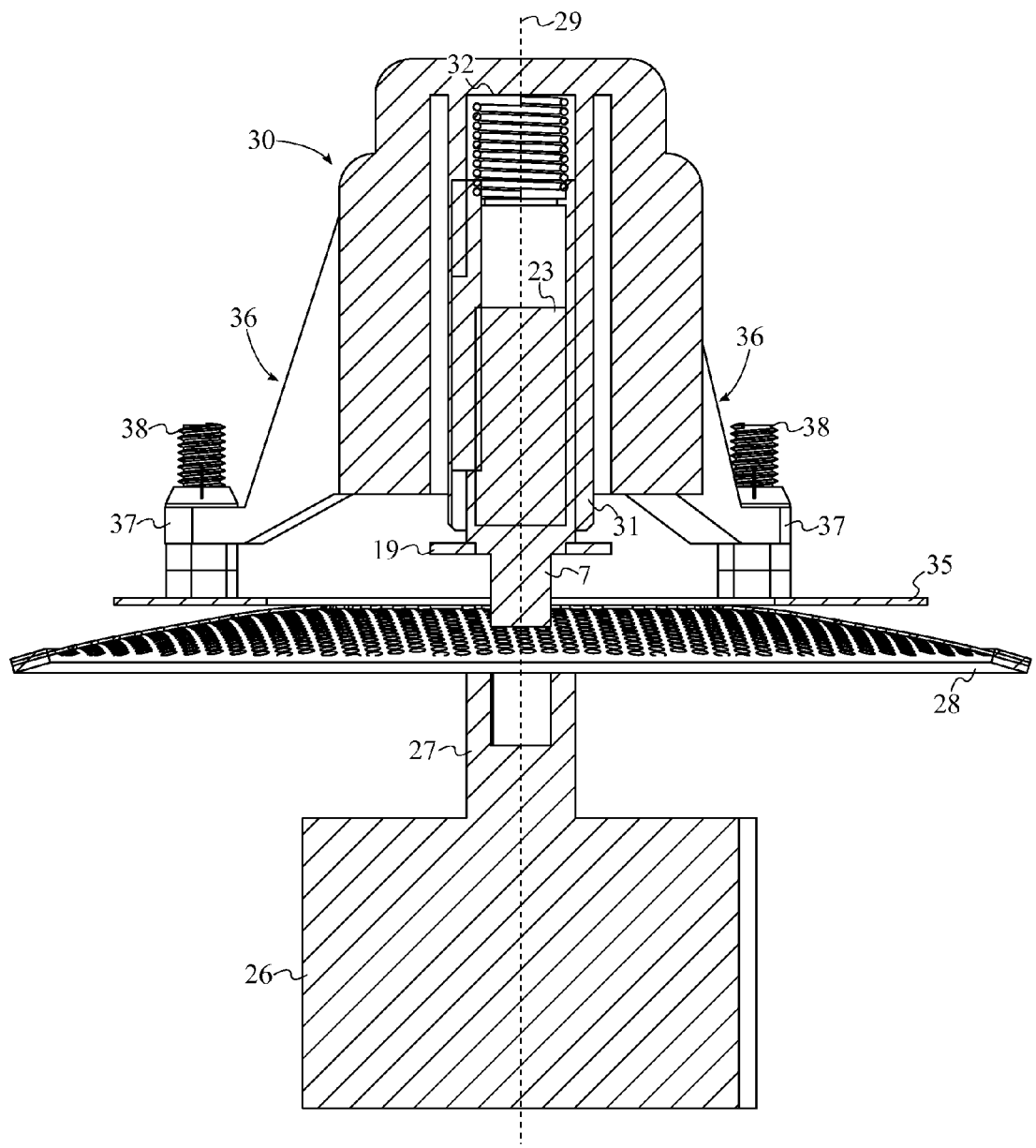
FIG. 15 is a cross-sectional view of the present invention and the rotary pump uncoupled from the ride lawnmower engine taken along line C-C of FIG. 14.

The present invention further comprises a plug 23 and a shaft keyway slot 24 for the tubular coupling shaft. As shown in FIG. 13, a driveshaft key 34 is utilized to join the tubular coupling shaft 1 to the input sleeve 31. The shaft keyway slot 24 for the tubular coupling shaft is able to accept the driveshaft key 34. The driveshaft key 34 is inserted into the shaft keyway slot 24 for the tubular coupling shaft in order to couple the tubular coupling shaft 1 to the rotary pump 30. The plug 23 prevents the driveshaft key 34 from falling into the tubular coupling shaft 1 and as such is positioned within the tubular coupling shaft 1 in between the closed end 3 and the lip 22 as shown in FIG. 4. This allows the driveshaft key 34 to protrude out of the tubular coupling shaft 1 through the shaft keyway slot 24 for the coupling shaft. The driveshaft key 34 may then be inserted into the sleeve keyway slot 33 for the input sleeve as well. The shaft keyway slot 24 for the tubular coupling shaft traverses laterally into the tubular coupling shaft 1 from the open end 2, facilitating insertion of the driveshaft key 34 into the shaft keyway slot 24 for the tubular coupling shaft from the open end 2. In order to allow the driveshaft key 34 to protrude from the tubular coupling shaft 1 through the shaft keyway slot 24 for the tubular coupling shaft, the shaft keyway slot 24 for the tubular coupling shaft is positioned adjacent to the plug 23 as shown in FIG. 3 and FIG. 4.

Again with reference to FIGS. 1-4, FIG. 9, and FIG. 10, the height adjusting clamp 8 comprises a long arm 9, an offset arm 13, a female threaded knob 14, and a linkage plate 15. The long arm 9 and the female threaded knob 14 are utilized to lower and raise the rotary pump 30 when coupling and uncoupling the ride lawnmower engine 26 and the rotary pump 30. The female threaded knob 14 is engaged to a male threaded end 11 of the long arm 9. As such, rotating the female threaded knob 14 in the counterclockwise and clockwise directions correspondingly lowers or raises the female threaded knob 14 along the long arm 9. The female threaded knob 14 may be turned along the long arm 9 in order to lower or raise the rotary pump 30. The offset arm 13 joins the height adjusting clamp 8 to the washer 19 while the linkage plate 15 joins the height adjusting clamp 8 to the rotary pump 30. The long arm 9 is positioned parallel with the tubular coupling shaft 1 in order to allow the female threaded knob 14, the rotary pump 30, and the tubular coupling shaft 1 to move along the same axis during coupling and uncoupling of the ride lawnmower engine 26 and the rotary pump 30. The offset arm 13 is adjacently connected to a proximal end 10 of the long arm 9 while the washer 19 is adjacently connected to the offset arm 13, opposite to the long arm 9. As such, the height adjusting clamp 8 is able to exert pressure on the tubular coupling shaft 1 through the washer 19. In the preferred embodiment of the present invention, the offset arm 13 is oriented at an obtuse angle 25 with the long arm 9 as shown in FIG. 3. The orientation of the offset arm 13 at an obtuse angle 25 relative to the long arm 9 provides clearance between the offset arm 13, the long arm 9, the rotary pump 30, and any other objects in the vicinity of the present invention during use. The linkage plate 15 may be joined to the rotary pump 30 and is positioned normal to the long arm 9 in order to allow the rotary pump 30 to move along the same axis as the female threaded knob 14 when the female threaded knob 14 is rotated. The linkage plate 15 is slidably engaged with the long arm 9, allowing the linkage plate 15 to freely slide up and down the long arm 9 based on user input through the female threaded knob 14. Additionally, the linkage plate 15 is positioned adjacent to the female threaded knob 14 in order to allow the female threaded knob 14 to come into contact with the linkage plate 15 when the rotary pump 30 is being lowered or raised.

Figure 7:
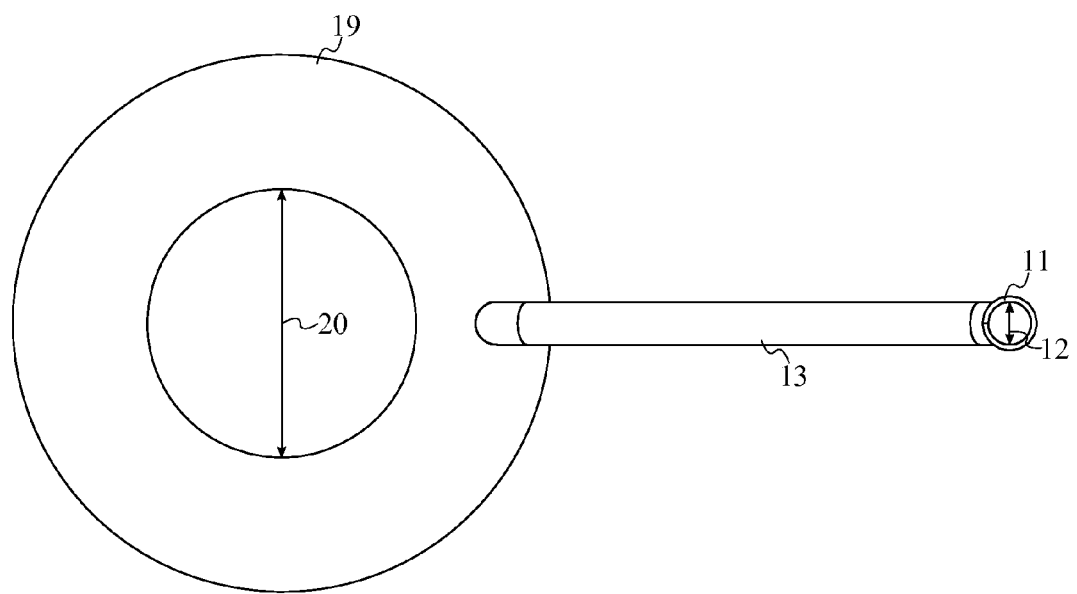
FIG. 7 is a top view of the long arm, the offset arm, and the washer.
Figure 8:
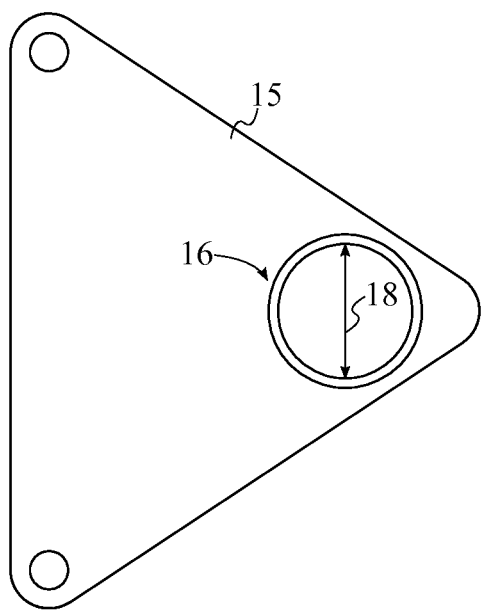
FIG. 8 is a top view of the pump linkage sleeve and the linkage plate.
Figure 9:
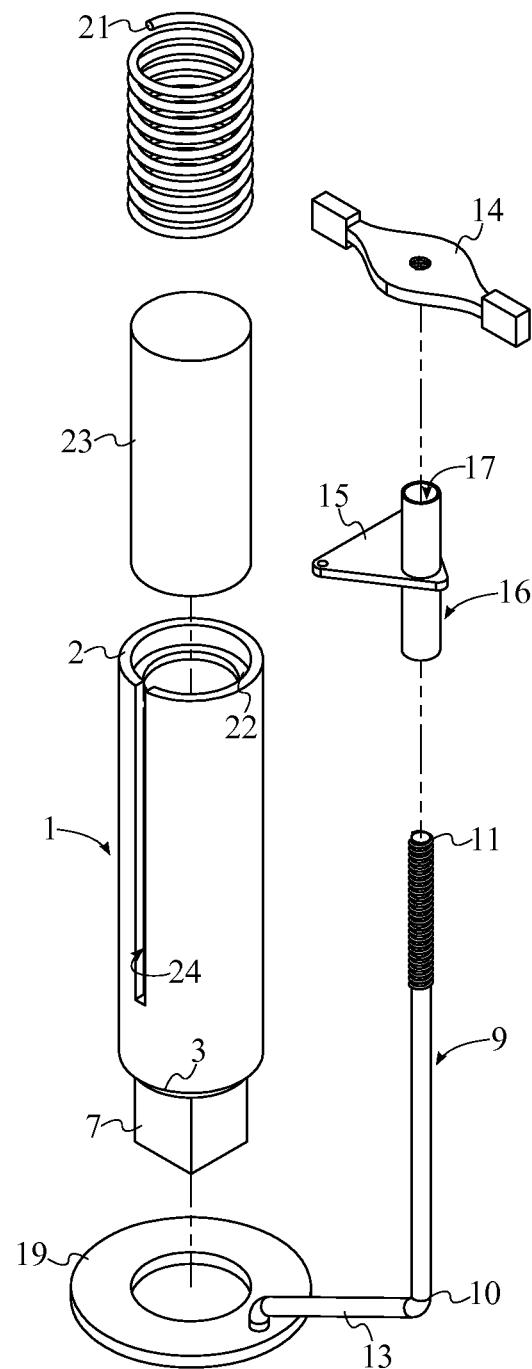
FIG. 9 is an exploded perspective view of the present invention.

With reference to FIGS. 1-3 and FIGS. 8-10, the height adjusting clamp 8 further comprises a pump linkage sleeve 16. The pump linkage sleeve 16 is connected normal to the linkage plate 15. As such, the pump linkage sleeve 16, along with the linkage plate 15, is utilized to join the height adjusting clamp 8 to the rotary pump 30 as shown in FIGS. 11-15. This connection between the height adjusting clamp 8 and the rotary pump 30 allows the height adjusting clamp 8 to physically lower or raise the rotary pump 30 as needed by the user when coupling or uncoupling the ride lawnmower engine 26 and the rotary pump 30. The pump linkage sleeve 16 comprises a sleeve through hole 17 that allows the pump linkage sleeve 16 to move along the long arm 9. The sleeve through hole 17 traverses through the pump linkage sleeve 16 allowing the pump linkage sleeve 16 to slide freely when the rotary pump 30 is being lowered or raised. The pump linkage sleeve 16 is slidably connected along the long arm 9 in between the female threaded knob 14 and the offset arm 13. This allows the female threaded knob 14 to physically move the pump linkage sleeve 16 when the female threaded knob 14 is turned counterclockwise or clockwise along the long arm 9. Because the pump linkage sleeve 16 is able to slide freely along the long arm 9, the cross-sectional diameter of the sleeve through hole 18 is larger than the cross-sectional diameter of the long arm 12. The cross-sectional diameter of the long arm 12 and the cross-sectional diameter of the sleeve through hole 18 are shown in FIG. 7 and FIG. 8, respectively.

Figure 5:
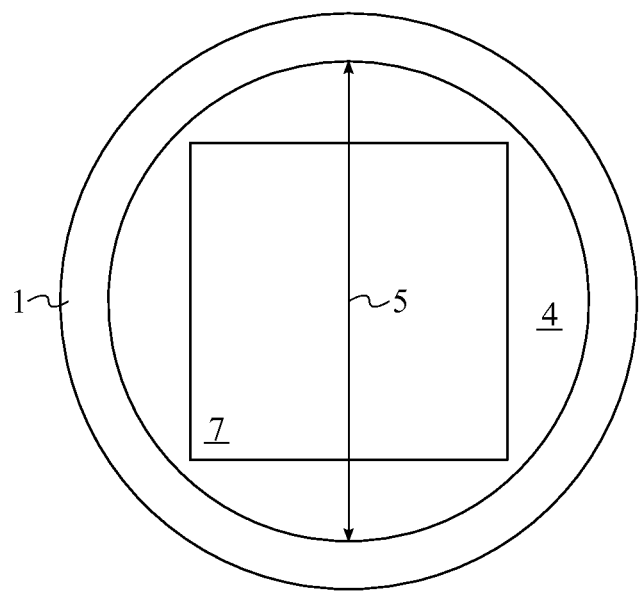
FIG. 5 is a bottom view of the tubular coupling shaft showing the outer diameter of the step down portion.
Figure 6:
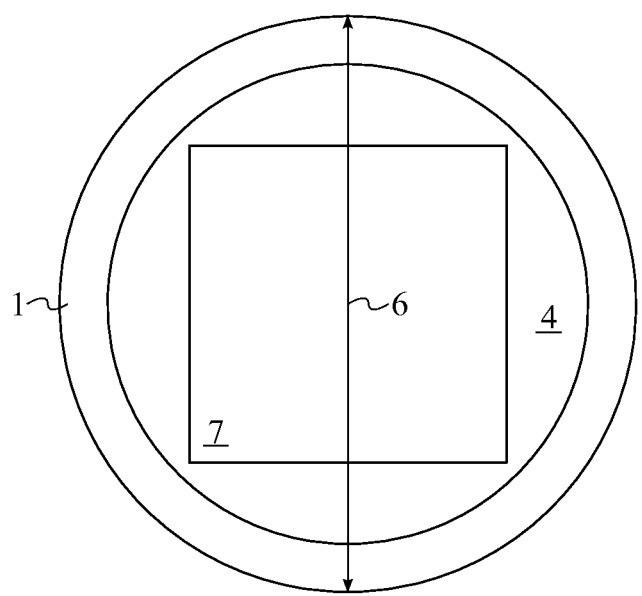
FIG. 6 is a bottom view of the tubular coupling shaft showing the cross-sectional diameter of the closed end.
Figure 10:
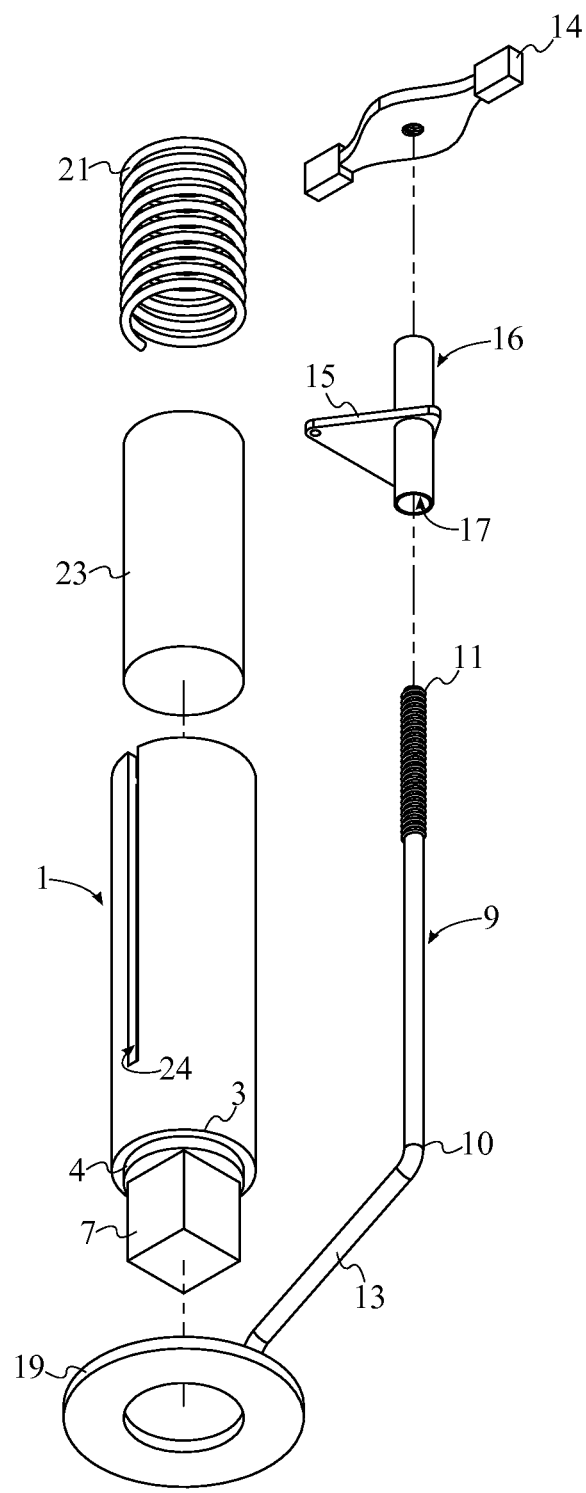
FIG. 10 is an exploded alternate perspective view of the present invention.
Figure 11:
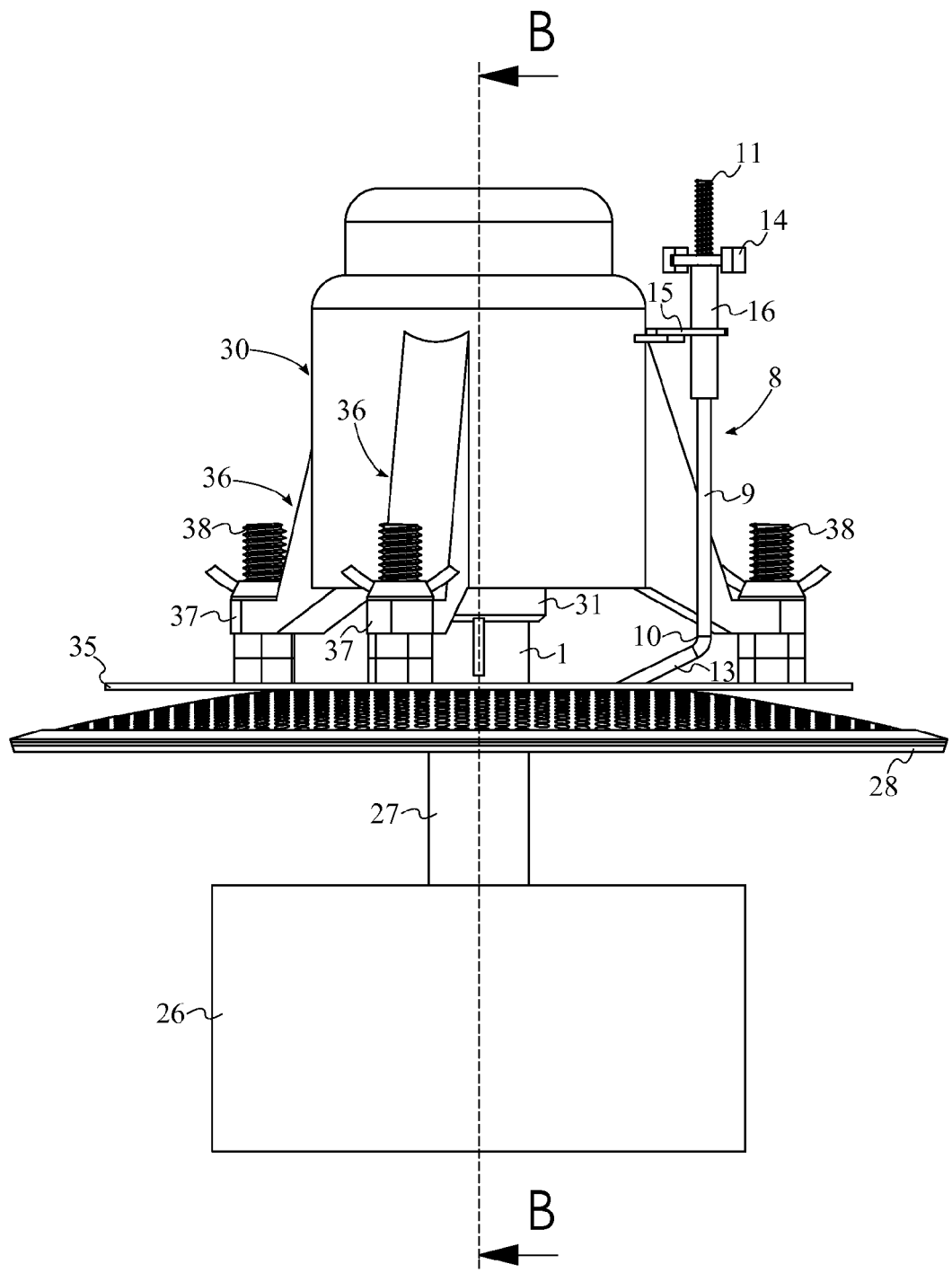
FIG. 11 is a front view of the present invention coupled to the ride lawnmower engine and the rotary pump.

The present invention further comprises a step down portion 4 as shown in FIG. 4, FIG. 10, and FIG. 13. The step down portion 4 is utilized to secure the washer 19 to the tubular coupling shaft 1, allowing the height adjusting clamp 8 to be utilized to lower and raise the tubular coupling shaft 1 through the linkage plate 15 and the pump linkage sleeve 16. As such, the outer diameter 5 of the step down portion 4 is less than the cross-sectional diameter of the closed end 6 and is equal to the inner diameter 20 of the washer 19 as shown in FIGS. 5-7. Additionally, the step down portion 4 is integrated into the closed end 3 allowing the washer 19 to come into contact with the step down portion 4 and the closed end 3. The step down portion 4 is encircled by the washer 19 in order to prevent the washer 19 from separating from the step down portion 4.

Again referring to FIGS. 11-15, in its preferred embodiment, the present invention is utilized to connect and transmit power from a ride lawnmower engine 26 to a rotary pump 30. In order to connect the ride lawnmower engine 26 to the rotary pump 30, the axial motor adapter 7 is selectively coupled to the driveshaft 27, joining the present invention to the ride lawnmower engine 26. Selectively coupling the axial motor adapter 7 to the driveshaft 27 ensures that the rotary pump 30 is not continuously running when unneeded as the user is able to uncouple the axial motor adapter 7 from the driveshaft 27. The tubular coupling shaft 1 is then coupled to the input sleeve 31 by inserting the tubular coupling shaft 1 into the input sleeve 31, joining the present invention to the rotary pump 30. When the present invention is attached to the rotary pump 30, the tubular coupling shaft 1 is inserted until the compression spring 21 is pressed against an end surface 32 within the input sleeve 31. This ensures that the compression spring 21 is able to compress due to force exerted on the compression spring 21 by the lip 22 and the end surface 32. The rotary pump 30 is then mounted from the external covering 28 such that the input sleeve 31 and the driveshaft 27 are coaxially aligned. After the rotary pump 30 is mounted, the linkage plate 15 is laterally connected to the rotary pump 30 in order to allow the height adjusting clamp 8 to regulate the vertical positioning of the tubular coupling shaft 1 within the input sleeve 31.

When connecting the present invention to the rotary pump 30, the driveshaft key 34 is inserted into the shaft keyway slot 24 for the tubular coupling shaft as shown in FIG. 13. The driveshaft key 34 allows the input sleeve 31 to rotate along with the tubular coupling shaft 1 based on rotational motion provided by the ride lawnmower engine 26. Additionally, the driveshaft key 34 prevents relative motion between the input sleeve 31 and the driveshaft 27. When the driveshaft key 34 is inserted into the shaft keyway slot 24 for the tubular coupling shaft, the driveshaft key 34 is pressed against the plug 23 in order to laterally protrude the driveshaft key 34 from the tubular coupling shaft 1. Additionally, the sleeve keyway slot 33 for the input sleeve is coincidentally aligned with the shaft keyway slot 24 for the tubular coupling shaft. This ensures that the driveshaft key 34 is able to engage the sleeve keyway slot 33 for the input sleeve by sliding the tubular coupling shaft 1 into the input sleeve 31. Once the driveshaft key 34 has been engaged to the shaft keyway slot for the tubular coupling shaft and the sleeve keyway slot 33 for the input sleeve, the tubular coupling shaft 1 and the input sleeve 31 are able to rotate together.

During use of the present invention, the present invention is utilized in conjunction with an annular stabilizing plate 35 that provides a stable surface on which the present invention may rest on the ride lawnmower engine 26 as shown in FIGS. 11-15. The annular stabilizing plate 35 is positioned around the tubular coupling shaft 1 and is mounted onto the external covering 28 to allow the rotary pump 30 to be mounted onto the annular stabilizing plate 35 over the external covering 28. The rotary pump 30 is then fixedly mounted onto the annular stabilizing plate 35 in order to ensure that the rotary pump 30 remains stable when coupled to the ride lawnmower engine 26. After the rotary pump 30 is in place on the annular stabilizing plate 35, a plurality of fasteners 38 is utilized to secure the rotary pump 30 to the annular stabilizing plate 35. The plurality of fasteners 38 is radially positioned about the annular stabilizing plate 35. The plurality of fasteners 38 is mounted normal to the external covering 28 in order to secure the rotary pump 30 to the annular stabilizing plate 35 through the plurality of offset legs 36. A distal end 37 for each of the plurality of offset legs 36 is then fixedly engaged to a corresponding fastener from the plurality of fasteners 38 in order to secure the rotary pump 30 in place on the annular stabilizing plate 35.

The axial motor adapter 7 is engaged to the driveshaft 27 by actuating the height adjusting clamp 8 in order to increase the length 39 between the linkage plate 15 and the washer 19. As the length 39 is increased, the tubular coupling shaft 1 is lowered in order to allow the axial motor adapter 7 that is adjacently connected to the closed end 3 to engage the driveshaft 27. The ride lawnmower engine 26 and the rotary pump 30 are shown coupled together via the present invention in FIG. 11 and FIG. 12. The female threaded knob 14 is rotated counterclockwise in order to allow the compression spring 21 to release its potential energy and lower the tubular coupling shaft 1 along with the axial motor adapter 7. The axial motor adapter 7 is disengaged from the driveshaft 27 by actuating the height adjusting clamp 8 in order to decrease the length 39 between the linkage plate 15 and the washer 19. The female threaded knob 14 is rotated clockwise in order to compress the compression spring 21. This in turn raises the tubular coupling shaft 1 and disengages the axial motor adapter 7 from the driveshaft 27, effectively uncoupling the ride lawnmower engine 26 and the rotary pump 30. The ride lawnmower engine 26 and the rotary motor 30 are shown uncoupled in FIG. 14 and FIG. 15.

The object of the present invention is to provide a means of connecting and transmitting power from the ride lawnmower engine 26 to the rotary pump 30. The height adjusting clamp 8 allows the user to manually engage and disengage the present invention at any time. As such, the user is able to uncouple the ride lawnmower engine 26 from the rotary pump 30 as needed in order to ensure that the rotary pump 30 is not left continuously running when unneeded.

Although the present invention has been explained in relation to its preferred embodiment, it is understood that many other possible modifications and variations can be made without departing from the spirit and scope of the present invention as hereinafter claimed.

What is claimed is:
1. A coupling device for a ride lawnmower engine and a rotary pump comprises:
   a tubular coupling shaft;
   an axial motor adapter;
   a height adjusting clamp;
   a washer;
   a compression spring;

the tubular coupling shaft comprises an open end and a closed end;
the axial motor adapter being adjacently connected to the closed end;
the tubular coupling shaft being encircled by the washer;
the tubular coupling shaft being rotatably connected to the washer, adjacent to the axial motor adapter;
the compression spring being adjacently mounted into the open end; and
the height adjusting clamp being laterally connected to the washer;
a plug;
a shaft keyway slot;
the plug being positioned within the tubular coupling shaft in between the closed end and a lip;
the shaft keyway slot traversing laterally into the tubular coupling shaft;
the shaft keyway slot traversing into the tubular coupling shaft from the open end; and
the shaft keyway slot being positioned adjacent to the plug.

2. The coupling device for a ride lawnmower engine and a rotary pump as claimed in claim 1 further comprises:
a lip;
the lip being circumferentially integrated into the open end; and
the compression spring being positioned against the lip.

3. The coupling device for a ride lawnmower engine and a rotary pump as claimed in claim 1 further comprises:
the height adjusting clamp comprises a long arm, an offset arm, a female threaded knob, and a linkage plate;
the long arm being positioned parallel with the tubular coupling shaft;
the offset arm being adjacently connected to a proximal end of the long arm;
the washer being adjacently connected to the offset arm, opposite to the long arm;
the linkage plate being positioned normal to the long arm;
the linkage plate being slidably engaged with the long arm;
the female threaded knob being engaged to a male threaded end of the long arm; and
the linkage plate being positioned adjacent to the female threaded knob.

4. The coupling device for a ride lawnmower engine and a rotary pump as claimed in claim 3 further comprises:
the offset arm being oriented at an obtuse angle with the long arm.

5. The coupling device for a ride lawnmower engine and a rotary pump as claimed in claim 3 further comprises:
the height adjusting clamp further comprises a pump linkage sleeve;
the pump linkage sleeve comprises a sleeve through hole;
a cross-sectional diameter of the sleeve through hole being larger than a cross-sectional diameter of a long arm;
the pump linkage sleeve being connected normal to the linkage plate;
the sleeve through hole traversing through the pump linkage sleeve; and
the pump linkage sleeve being slidably connected along the long arm in between the female threaded knob and the offset arm.

6. The coupling device for a ride lawnmower engine and a rotary pump as claimed in claim 1 further comprises:
a step down portion;
an outer diameter of the step down portion being less than a cross-sectional diameter of the closed end and being equal to an inner diameter of the washer;
the step down portion being integrated into the closed end; and
the step down portion being encircled by the washer.

7. A method of mounting the coupling device for a ride lawnmower engine and a rotary pump as claimed in claim 1 to a lawnmower and a pressure pump, the method comprises the steps of:
providing a ride lawnmower engine, wherein a driveshaft of the ride lawnmower engine is rotating about a vertical axis;
providing a rotary pump, wherein the rotary pump includes an input sleeve;
selectively coupling the axial motor adapter to the driveshaft;
coupling the tubular coupling shaft to the input sleeve;
pressing the compression spring against an end surface of the input sleeve;
mounting the rotary pump from an external covering of the ride lawnmower engine; and
laterally connecting a linkage plate of the height adjusting clamp to the rotary pump.

8. The method of mounting the coupling device for a ride lawnmower engine and a rotary pump to a lawnmower and a pressure pump, the method as claimed in claim 7 comprises the steps of:
providing a driveshaft key;
providing a sleeve keyway slot for the input sleeve;
inserting the driveshaft key into the shaft keyway slot for the tubular coupling shaft;
pressing the driveshaft key against a plug in order to laterally protrude the driveshaft key from the tubular coupling shaft, wherein the plug is positioned within the tubular coupling shaft in between the closed end and a lip;
coincidentally aligning the sleeve keyway slot for the input sleeve and the shaft keyway slot for the tubular coupling shaft; and
engaging the driveshaft key to the sleeve keyway slot for the input sleeve by sliding the tubular coupling shaft into the input sleeve.

9. The method of mounting the coupling device for a ride lawnmower engine and a rotary pump to a lawnmower and a pressure pump, the method as claimed in claim 7 comprises the steps of:
providing an annular stabilizing plate;
positioning the annular stabilizing plate around the tubular coupling shaft;
mounting the annular stabilizing plate onto the external covering; and
fixedly mounting the rotary pump onto the annular stabilizing plate.

10. The method of mounting the coupling device for a ride lawnmower engine and a rotary pump to a lawnmower and a pressure pump, as claimed in claim 9, wherein the external covering is a mesh screen.

11. The method of mounting the coupling device for a ride lawnmower engine and a rotary pump to a lawnmower and a pressure pump, the method as claimed in claim 7 comprises the steps of:
providing a plurality of offset legs, wherein the plurality of offset legs is radially connected about the rotary pump;
radially positioning a plurality of fasteners about the annular stabilizing plate;

mounting the plurality of fasteners normal to the external covering; and fixedly engaging a distal end for each of the plurality of offset legs to a corresponding fastener from the plurality of fasteners.

12. The method of mounting the coupling device for a ride lawnmower engine and a rotary pump to a lawnmower and a pressure pump, the method as claimed in claim 7 comprises the steps of:

engaging the axial motor adapter to the driveshaft by actuating the height adjusting clamp in order to increase a length between the linkage plate and the washer.

13. The method of mounting the coupling device for a ride lawnmower engine and a rotary pump to a lawnmower and a pressure pump, the method as claimed in claim 7 comprises the steps of:

disengaging the axial motor adapter to the driveshaft by actuating the height adjusting clamp in order to decrease a length between the linkage plate and the washer.

14. A coupling device for a ride lawnmower engine and a rotary pump comprises:

a tubular coupling shaft;
an axial motor adapter;
a height adjusting clamp;
a washer;
a compression spring;
the tubular coupling shaft comprises an open end and a closed end;
the height adjusting clamp comprises a long arm, an offset arm, a female threaded knob, a linkage plate, and a pump linkage sleeve;
the pump linkage sleeve comprises a sleeve through hole;
the axial motor adapter being adjacently connected to the closed end;
the tubular coupling shaft being encircled by the washer;
the tubular coupling shaft being rotatably connected to the washer, adjacent to the axial motor adapter;
the compression spring being adjacently mounted into the open end;
the height adjusting clamp being laterally connected to the washer;
the long arm being positioned parallel with the tubular coupling shaft;
the offset arm being adjacently connected to a proximal end of the long arm;
the washer being adjacently connected to the offset arm, opposite to the long arm;
the linkage plate being positioned normal to the long arm;
the linkage plate being slidably engaged with the long arm;
the female threaded knob being engaged to a male threaded end of the long arm;
the linkage plate being positioned adjacent to the female threaded knob;
the offset arm being oriented at an obtuse angle with the long arm;
a cross-sectional diameter of the sleeve through hole being larger than a cross-sectional diameter of a long arm;
the pump linkage sleeve being connected normal to the linkage plate;
the sleeve through hole traversing through the pump linkage sleeve; and
the pump linkage sleeve being slidably connected along the long arm in between the female threaded knob and the offset arm.

15. The coupling device for a ride lawnmower engine and a rotary pump as claimed in claim 14 further comprises:

a lip;
the lip being circumferentially integrated into the open end; and
the compression spring being positioned against the lip.

16. The coupling device for a ride lawnmower engine and a rotary pump as claimed in claim 14 further comprises:

a plug;
a shaft keyway slot;
the plug being positioned within the tubular coupling shaft in between the closed end and a lip;
the shaft keyway slot traversing laterally into the tubular coupling shaft;
the shaft keyway slot traversing into the tubular coupling shaft from the open end; and
the shaft keyway slot being positioned adjacent to the plug.

17. The coupling device for a ride lawnmower engine and a rotary pump as claimed in claim 14 further comprises:

a step down portion;
an outer diameter of the step down portion being less than a cross-sectional diameter of the closed end and being equal to an inner diameter of the washer;
the step down portion being integrated into the closed end; and
the step down portion being encircled by the washer.

* * * * *